May 27, 1941.  G. T. HUXFORD ET AL  2,243,252
FLUID FLOW METER
Filed Jan. 16, 1939  3 Sheets-Sheet 1

George T. Huxford
Edgar R. Loud
INVENTORS

BY *Harry Dexter Peck*
ATTORNEY

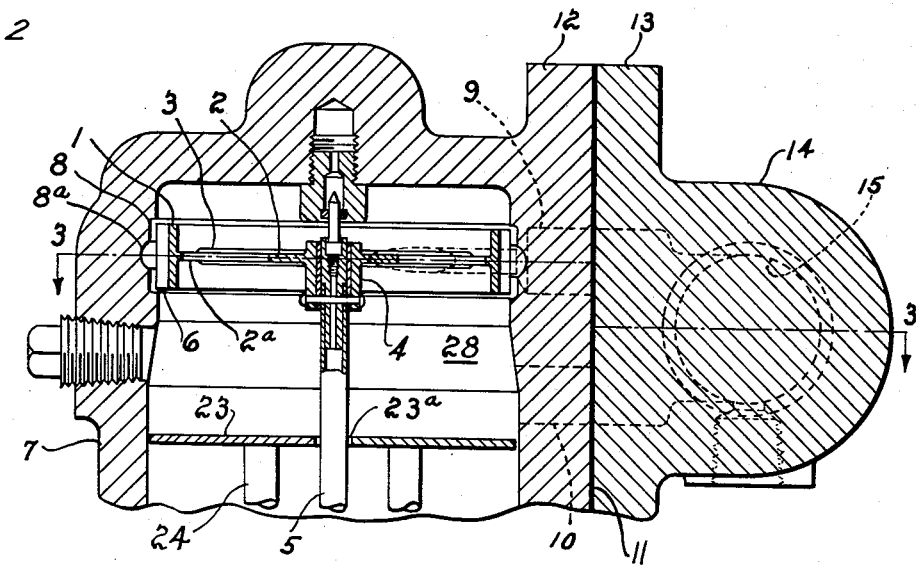
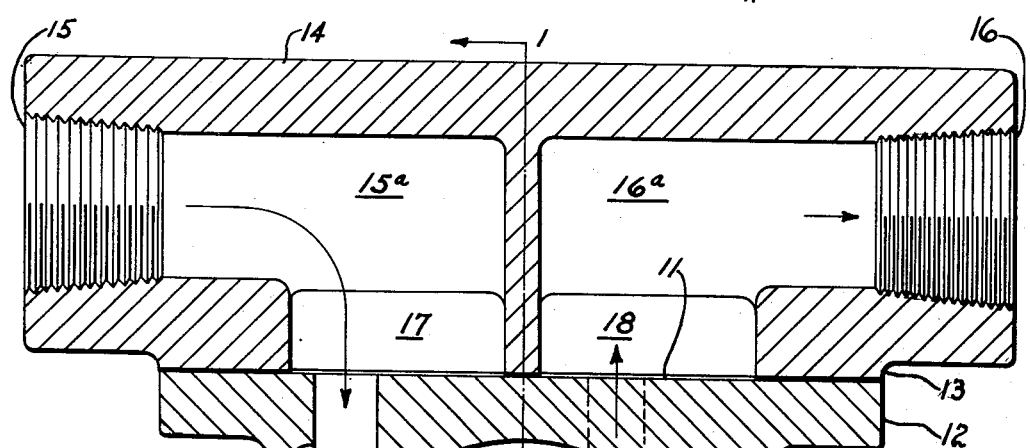
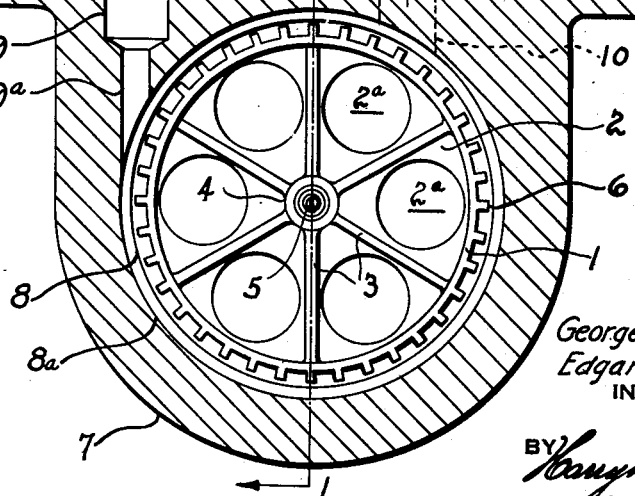

May 27, 1941. G. T. HUXFORD ET AL 2,243,252
FLUID FLOW METER
Filed Jan. 16, 1939   3 Sheets-Sheet 3

George T. Huxford
Edgar R. Loud
INVENTORS

BY Harry Dexter Peck
ATTORNEY

Patented May 27, 1941

2,243,252

UNITED STATES PATENT OFFICE 2,243,252

FLUID FLOW METER

George T. Huxford, North Kingstown, and Edgar R. Loud, Cranston, R. I., assignors to Builders Iron Foundry, Providence, R. I., a corporation of Rhode Island Application January 16, 1939, Serial No. 251,262
In Great Britain February 4, 1938

5 Claims. (Cl. 73—230)

This invention relates to fluid flow meters. In one convenient application of our invention the meter may be inserted in a flow line and all of the fluid flow passed through the meter.

It is a feature of our invention to provide a rotor which is driven by the flowing fluid and the rotations of which are utilized to actuate the indicating means of the apparatus.

It is a further feature to provide on the rotor a cylindrical surface and to admit fluid from a flow line with substantial tangential contact against said surface. After making such contact and imparting movement to the rotor, the fluid is returned to the flow line. Circumferentially adjacent the cylindrical surface is a passageway for the fluid wherein it is substantially confined during its movement with the said surface to prevent any undue side thrust by the rotor.

The rotor preferably embodies suitable damping means to prevent over-speeding of the rotating elements.

The movement of the rotor may be utilized to actuate indicating, integrating or recording means, as desired.

When the meter is to be used for measuring the flow of a gas, the invention also provides a safeguard against the inadvertent flow of liquid or foreign material along with the gas to the rotor.

The best mode in which we have contemplated applying the principles of our invention is shown in the accompanying drawings but these are to be taken merely as illustrative of the principles of our invention.

In the drawings:

Figure 2 is a portion of the vertical section shown in Figure 1 but drawn to larger scale;

Figure 3 is a plan in section as on line 3—3 of Figure 2;

Figure 1:
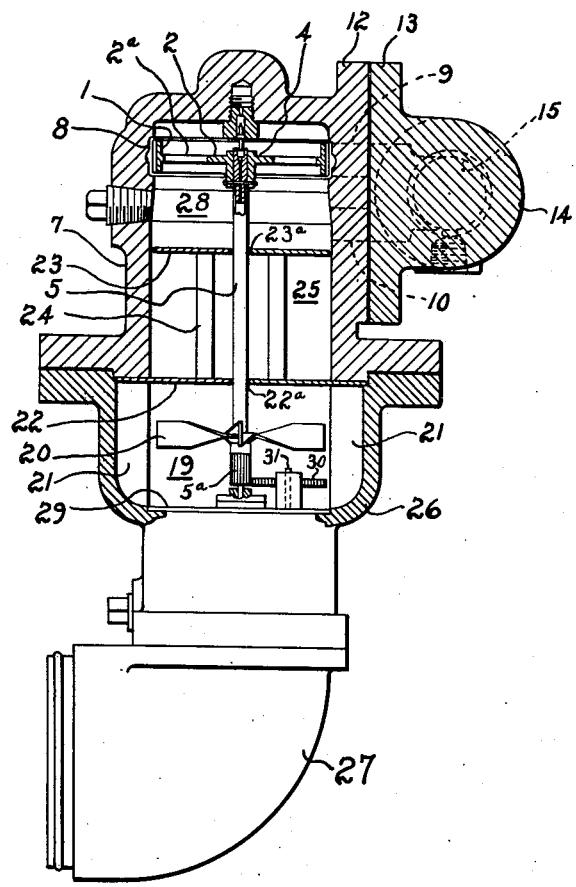
Figure 1 is a vertical section, as on line 1—1 of Figure 3, of a meter embodying our improvements.

Referring more particularly to the drawings, in the preferred embodiment of the invention the rotor comprises a short vertical hollow cylinder or ring 1 secured by a perforated plate portion 2, having pressed spoke-like ribs 3, to a hub 4 fixed on a vertical spindle 5. The outer edge or surface of the rotor may preferably be provided with a series of blades 6 which extend vertically across the surface. The latter constitutes the operating surface of the rotor which rotates in a meter casing 7. This casing is formed, in line with and close to the operating surface of the rotor, with a circumferential groove 8 forming around the operating surface of the rotor part of the passageway for the fluid to be metered. This groove 8 is only a little wider than the height of the operating surface, having preferably a recessed portion 8a (see Figure 2) midway of its face, about opposite the center line of the operating surface. Into this groove opens an inlet passage 9 formed at its end 9a to constitute an inlet nozzle for discharge of the fluid into the groove tangentially with respect to the operating surface of the rotor and substantially perpendicular to a side face of a blade on that surface. Below the groove is an outlet passage 10 which terminates, as does the inlet passage 9, in a plane face 11 of a flanged portion 12 of the meter casing. Hence fluid admitted through the inlet passage 9 will enter the groove 8 and actuate the rotor passing eventually downward and upward from the edges of the groove. That portion of the fluid which passes upward escapes downward finally through holes 2a in the plate portion 3 and flows thence to the outlet passage 10.

The flange 12 on the meter casing is arranged to be secured (either directly or through a distance element hereafter referred to) to a flange portion 13 on a second casing part 14 having an upstream inlet 15 and a downstream outlet 16 for connection in the pipe line through which flows the fluid to be metered. In this second part is formed an upstream chamber 15a communicating with the upstream inlet, and a downstream chamber 16a communicating with the downstream outlet. The flange portion 13 on this second part is provided with two openings 17 and 18 arranged respectively to register with the inlet 9 and outlet 10 formed in the meter casing 7. The opening 17 arranged to register with the inlet 9 opens into the upstream chamber 15a while the other opening 18 registers with the downstream chamber 16a. When the meter is employed for measuring the flow of a gas, the arrangement of the chamber 15a substantially below the inlet passage 9, together with the fact that the latter requires a rather abrupt change in the direction of flow, causes any foreign particles being carried along by the gas to be collected in the chamber 15a and thus prevented from passing on to the groove 8.

When now the meter part of the casing is secured through its flange 12 to the flange 13 on the second part, fluid will flow from the upstream pipe to the upstream chamber 15a through the opening 17 to the inlet passage 9 and to the circumferential groove 8. After passing substantially along this groove and actuating the rotor the fluid will enter the discharge passage 10 and flow through the corresponding opening 18 and the downstream chamber 16a to the downstream pipe. By reason of the closeness of the periphery of the operating surface of the rotor to the surface of the circumferential groove, the fluid is prevented from exerting undue side thrust on the rotor. Moreover, the provision for escape of the fluid from the upper and lower edges of the circumferential groove prevents any back-pressure, as it were, on the rotor and enables the force of the entering fluid to be effectively utilized in driving the rotor.

Figure 6:
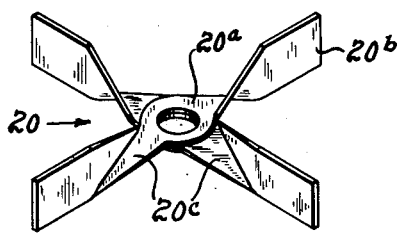
Figure 6 is a perspective of the damping blades.

To steady the rotation of the rotor there is provided in a chamber 19 a series of damping blades 20 on the shaft 5. A series of four blades is shown and as particularly illustrated in Fig. 6 each such blade starts from the hub ring as a short horizontal portion 20a and terminates in a vertically extending fluid engaging portion 20b. Between the short horizontal portion 20a and the vertical portion 20b each blade has a portion 20c which is angularly bent about its axis. It is a feature that in each successive blade this angular portion 20c is bent in the reverse direction about the blade axis to avoid any pronounced upward or downward thrust along the shaft 5. Diametrically opposed vertical fins 21 are provided at the outer wall of chamber 19 to break up the tendency of the damping liquid to whirl around with the blades.

It will be noted that at the upper end of chamber 19 is a separator plate 22 engaged at its edge between portions of the casing. Still further upward in the meter is another such separator plate 23 which is supported on distance posts 24, at least one of which is tubular. This latter plate 23 is below but close by the outlet 10. Both plates 22 and 23 have central openings 22a and 23a respectively providing a space around the shaft 5.

When the meter is to be used for measuring the flow of steam the chamber 19 is preferably filled with water as the damping liquid. The central openings 22a and 23a and the tubular post 24 insures that air can readily escape from chamber 19 as the damping water is introduced. Were the surface of this water exposed to the hot steam the liquid would gradually be transformed into vapor and in time the level of liquid would fall below the blades 20. Even one such separator plate, as plate 22, will not entirely prevent this but by using the two plates 22 and 23 there is no such trouble. Such hot steam as passes downward through the central opening of plate 23, or past its outer edge, is permitted to cool in the space 25 between the plates so that it has no evaporating effect on the damping liquid. Thus the invention provides for a substantially constant damping effect which enhances the accurate performance of the meter.

The meter casing as a whole comprises three sections, the upper part 7, an intermediate part 26 and a lower or elbow-shaped part 27. The part 7 houses the chamber 28 through which the fluid acting on the rotor passes, and also the cooling chamber 25 between the plates 22 and 23. The intermediate part 26 houses the damping chamber 19 between plate 22 and a bottom plate 29, and a chamber below this latter plate in which is mounted the speed reducing mechanism. This mechanism is driven by the rotor by virtue of the teeth 5a at the lower end of shaft 5, the pinion 30 and a shaft 31 extending through plate 29 and into operative connection with the speed reducing mechanism. Motion of the latter mechanism is transmitted in any suitable manner to counter mechanism housed with the casing part 27.

Figure 4:
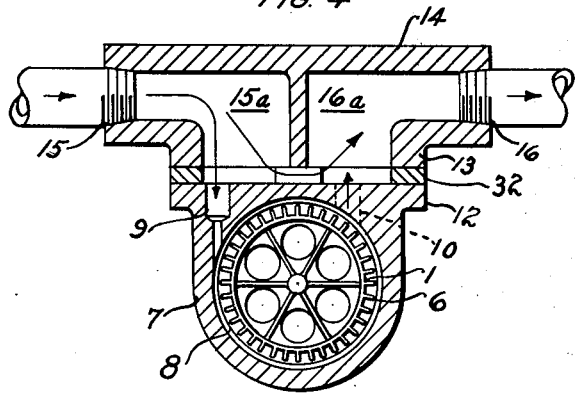
Figure 4 is a plan in section, like Figure 3, except that it includes a by-pass element.
Figure 5:
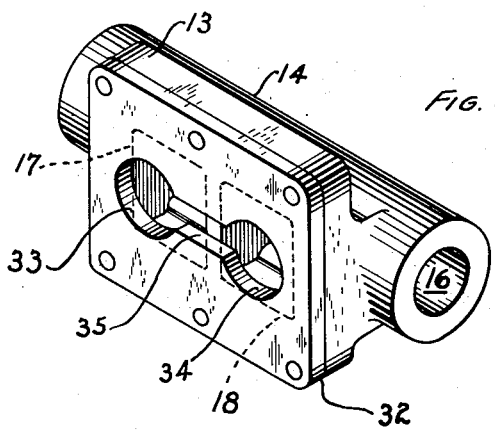
Figure 5 is a perspective particularly showing a by-pass element.

In cases where it is desired to measure only a predetermined (or shunt) part of the total flow through the pipe line, there can be employed distance plates or by-pass elements 32 (see Figures 4 and 5) of different thicknesses (corresponding to the proportion of the shunt required) which are adapted to be interposed between the flange 12 and the flange 13. These plates are cut out to provide two apertures 33 and 34 (see Figure 5) connected through a restricted passage 35. Such a plate when interposed between the meter casing 7 and the second part 14 of the casing provides a two part chamber, as it were, connected by a restricted passage, one part 33 of the chamber registering with the upstream opening 17 in the flange portion 13 and also with the inlet passage 9 to the meter part of the casing while the other chamber part 34 registers with the other or downstream opening 18 in the flange 13 and also registers with the outlet 10 from the meter casing. Hence when such a distance plate is inserted between the meter casing and the second part of the casing fluid will flow from the upstream chamber through its opening into one part of the two part chamber formed by the plate and some of the fluid will thence flow directly through the stricted passage 35 to the other part of the two part chamber and thence through the second opening into the downstream chamber in the second part of the casing. Other or shunt fluid, however, will pass from the first part of the two part chamber to the inlet passage 9 in the meter casing, through the circumferential groove 8 (during which it will cause rotation of the rotor) then out of the discharge passage 10 into the second part of the two part chamber and through the other opening to the downstream chamber. Obviously the proportion of fluid which will be shunted to the meter casing will depend upon the thickness of this distance piece.

It will be seen that the metering part of the mechanism can readily be removed from the pipe line by removing the meter part 7 of the casing from the second part 14. A plate (not shown) suitably grooved can be connected to the flange 13 on the second part of the casing in place of the meter part 7 of the casing to place the opening 17 communicating with the upstream chamber 15a therein in direct communication with the opening 18 which opens to the downstream chamber 16a, this arrangement enabling unmetered flow to take place.

We claim:

1. A meter for measuring the flow of fluid in a pipe line comprising a casing having inlet and outlet openings for connection with said line and having separated chambers connected with said openings respectively; a second casing attached to the first said casing having a chamber with a cylindrical wall portion; a rotor in the last said chamber having a cylindrical operating surface adjacent said wall portion; a circumferential groove in said wall portion opposite said operating surface; an inlet passage from the inlet chamber of the first said casing opening into said groove and arranged to direct the flow of fluid therein in tangential relation to said operating surface, there being provision between the edges of said operating surface and said groove for escape of the fluid into said rotor chamber as the fluid generally traverses the groove and effects rotation of said rotor; an outlet passage from said rotor chamber to the outlet chamber of the first said casing; and means actuated by said rotor for indicating the quantity flow of said fluid.

2. A meter for measuring the flow of fluid in a pipe line comprising a casing having inlet and outlet openings for connection with said line and having separated chambers connected with said openings respectively; a second casing attached to the first said casing having a chamber with a cylindrical wall portion; a rotor in the last said chamber having a cylindrical operating face with blades thereon adjacent said wall portion; a circumferential groove in said wall portion opposite said operating surface and said blades; an inlet passage from the inlet chamber of the first said casing opening into said groove and arranged to direct the flow of fluid therein in tangential relation to said operating surface and generally perpendicular to said blades, there being provision between the edges of said operating surface and blades and said groove for escape of the fluid into said rotor chamber as the fluid generally traverses the groove and effects rotation of said rotor; an outlet passage from said rotor chamber to the outlet chamber of the first said casing; and means actuated by said rotor indicating the quantity of flow of said fluid.

3. A meter for measuring flow of steam comprising a casing having an upper chamber with a cylindrical wall portion and a circumferential groove therearound; a shaft centrally located with respect to said circumferential groove; a rotor mounted on said shaft in said casing having a cylindrical operating surface adjacent said groove; an inlet passage leading to said groove for flow of steam thereto and generally therearound to effect rotation of said rotor; an outlet passage from said upper chamber for the steam after leaving said groove and surface; a lower chamber in said casing containing water into which said shaft extends; damping blades mounted on said shaft in said lower chamber for rotation within said water; and a pair of plates extending across the interior of said casing with central openings for said shaft and providing between them an intermediate space between said upper and lower chambers.

4. A meter for measuring the flow of steam comprising a casing having an upper chamber with a cylindrical wall portion and a circumferential groove therearound; a shaft centrally located with respect to said circumferential groove, a rotor mounted on said shaft in said casing having a cylindrical operating surface adjacent said groove; an inlet passage leading to said groove for flow of steam thereto and generally therearound to effect rotation of said rotor; an outlet passage from said upper chamber for the steam after leaving said groove and surface; a lower chamber in said casing containing water into which said shaft extends; damping blades mounted on said shaft in said lower chamber for rotation within said water; a plate extending across said casing at the top of said lower chamber having a central opening for said shaft; and a second plate supported by the first said plate at a distance from the first said plate and near the bottom of said upper chamber thereby to provide a space between said chambers wherein steam escaping from the upper chamber may condense within said space.

5. A meter for measuring the flow of fluid in a pipe line comprising a casing having inlet and outlet openings for connection with said line and having separated chambers connected with said openings respectively; a second casing attached to the first said casing having a chamber with a cylindrical wall portion; a rotor in the last said chamber having a cylindrical operating surface adjacent said wall portion; a circumferential groove in said wall portion opposite said operating surface; a passage from the inlet chamber of the first said casing leading to the rotor chamber having its inlet near the top of the inlet chamber and at the side thereof to effect an abrupt change in the direction of flow of the fluid, and having the outlet of said passage opening into said groove and arranged to direct the flow of fluid therein in tangential relation to said operating surface, there being provision between the edges of said operating surface and said groove for escape of the fluid into said rotor chamber as the fluid generally traverses the groove and effects rotation of said rotor; an outlet passage from said rotor chamber to the outlet chamber of the first said casing; and means actuated by said rotor for indicating the quantity flow of said fluid.

GEORGE T. HUXFORD.
EDGAR R. LOUD.